United States Patent
Ramsey et al.

(10) Patent No.: US 11,366,966 B1
(45) Date of Patent: Jun. 21, 2022

(54) NAMED ENTITY RECOGNITION AND DISAMBIGUATION ENGINE

(71) Applicant: Kensho Technologies, LLC, Cambridge, MA (US)

(72) Inventors: Michael Ramsey, Arlington, VA (US); Gabriel Parlato-Altay, Washington, DC (US); Aron Szanto, New York, NY (US); Anthony Liu, Cambridge, MA (US); Sireesh Gururaja, Cambridge, MA (US); Benjamin Hsu, Alexandria, VA (US); Domenic Puzio, Arlington, VA (US)

(73) Assignee: Kensho Technologies, LLC, Cambridge, MA (US)

( * ) Notice: Subject to any disclaimer, the term of this patent is extended or adjusted under 35 U.S.C. 154(b) by 317 days.

(21) Appl. No.: 16/512,652

(22) Filed: Jul. 16, 2019

(51) Int. Cl.
    *G06F 40/295* (2020.01)
    *G06N 20/00* (2019.01)

(52) U.S. Cl.
    CPC .......... *G06F 40/295* (2020.01); *G06N 20/00* (2019.01)

(58) Field of Classification Search
    None
    See application file for complete search history.

(56) References Cited

U.S. PATENT DOCUMENTS

| | | | | |
|---|---|---|---|---|
| 2010/0004925 | A1* | 1/2010 | Ah-Pine | G06F 40/295 704/9 |
| 2019/0354582 | A1* | 11/2019 | Schafer | G06F 17/16 |
| 2019/0385611 | A1* | 12/2019 | Smythe | G06N 20/00 |
| 2020/0151591 | A1* | 5/2020 | Li | G06N 20/00 |

FOREIGN PATENT DOCUMENTS

WO    WO-2007113585 A1 * 10/2007 ............ G06F 16/31

OTHER PUBLICATIONS

Han et al., "Collective Entity Linking in Web Text: A Graph-Based Method," Proceedings of the 34th International ACM SIGIR Conference on Research and Development in Information Retrieval, Jul. 2011, 765-774.

Phan et al., "Pair-Linking for Collective Entity Disambiguation: Two Could Be Better Than All," IEEE Transactions on Knowledge and Data Engineering, Jul. 2019, 31(7), 1383-1396.

Ratinov et al., "Local and Global Algorithms for Disambiguation to Wikipedia," Proceedings of the 49th Annual Meeting of the Association for Computational Linguistics: Human Language Technologies, Jun. 2011, 1:1375-1384.

* cited by examiner

*Primary Examiner* — Antim G Shah
(74) *Attorney, Agent, or Firm* — Fish & Richardson P.C.

(57) ABSTRACT

Methods, and systems for named entity recognition and disambiguation. One of the methods includes: receiving a document; extracting a plurality of mentions within the document; clustering the plurality of mentions to produce at least one cluster; identifying a plurality of candidate entities for the cluster; pairing each candidate entity and the cluster to create a plurality of candidate entity-cluster pairings; generating features for each candidate entity-cluster pairing; and selecting an entity, from the plurality of candidate entities, for the cluster based at least in part on features of a candidate entity pairing.

20 Claims, 5 Drawing Sheets

NAMED ENTITY RECOGNITION AND DISAMBIGUATION ENGINE

BACKGROUND

Technical Field

This specification relates to named entity recognition and disambiguation.

Background

Named entity recognition and disambiguation refers to the process of identifying text spans that reference named entities (people, places, things, etc) and linking each text span to its correct entry in a knowledge base.

SUMMARY

This specification describes technologies for named entity recognition and disambiguation. These technologies generally involve: receiving a document; clustering entity mentions extracted from the document into clusters; and predicting entities for each cluster, e.g., using a machine learning model such as a model trained on partially labeled documents. In one implementation, the model can be trained only on partially labeled documents.

In general, one innovative aspect of the subject matter described in this specification can be embodied in methods that include the actions of: receiving a document; extracting a plurality of mentions within the document; clustering the plurality of mentions to produce at least one cluster; identifying a plurality of candidate entities for the cluster; pairing each candidate entity and the cluster to create a plurality of candidate entity-cluster pairings; generating features for the plurality of candidate entity-cluster pairings; and selecting an entity, from the plurality of candidate entities, for the cluster based at least in part on features of the plurality of candidate entity pairings.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination.

Extracting a plurality of mentions within the document can include: extracting a number of mentions within a document; and breaking the document up into at least one sub-document, the sub-document including less text than the document, when the number of mentions within the document exceeds a threshold. Mention extraction can be performed by using a named entity recognition (NER) model or a gazetteer as discussed further below.

Clustering the plurality of mentions to produce at least one cluster can further include clustering using a coreferencer. A cluster of mentions can have a cluster representative.

Identifying a plurality of candidate entities for the cluster can include filtering the plurality of candidate entities to just those candidate entities with aliases having a similarity score above a threshold, wherein the similarity score measures the candidate's similarity to a cluster representative. Alternatively or in addition, one can use other techniques for identifying the plurality of candidate entities such as an elastic search fuzzy matching approach.

Each candidate entity-cluster pairing can have a candidate entity and generating features for a candidate entity-cluster pairing can include obtaining a probability that an arbitrary text span of a mention in the cluster is referring to the candidate entity in a candidate entity-cluster pairing. Each candidate entity-cluster pairing can have a candidate entity and generating features for a candidate entity-cluster pairing can include obtaining a conditional probability that a text string of a mention of the cluster is used to refer to the candidate entity. Each candidate entity-cluster pairing can have a candidate entity and generating features for each candidate entity-cluster pairing can include a conditional probability that the candidate entity is referenced by a text string of a mention of the cluster. Each candidate entity-cluster pairing can have a candidate entity and generating features for each candidate entity-cluster pairing can include obtaining a topic model vector similarity score between the document and text content for the candidate entity. Each candidate entity-cluster pairing can have a candidate entity and generating features for each candidate entity-cluster pairing can include generating a similarity score between a predicted type of a mention in the cluster, or for the cluster itself, and a type for the candidate entity for a candidate entity-cluster pairing. Each candidate entity-cluster pairing can have a candidate entity and generating features for each candidate entity-cluster pairing can include generating a similarity score between the embeddings of the document of a mention of the cluster and the embeddings of the textual content of a candidate entity.

Generating features for each candidate entity-cluster pairing can include generating a coherence score, wherein the method further includes performing the extracting, clustering, identifying and pairing steps for a plurality of clusters and wherein the coherence score indicates how coherent a candidate entity is given the other entities that have been associated with clusters. Stated differently, the coherence score indicates how well the candidate entity fits with the rest of the mention clusters. The coherence feature indicates a set of candidates that work well together—that one can refer to as the "coherent set". At the candidate entity-cluster pair level, this can translate into a boolean feature of whether the candidate is in that coherent set or not. One can use a score instead of a boolean feature to indicate how strongly a candidate entity fits in a coherent set. The coherence score can be based on at least one of anchor link probabilities and entity similarities.

Selecting an entity, from the plurality of candidate entities, for the cluster can include using a machine learning model to select an entity, from the plurality of candidate entities, for the cluster. The entity selection by the machine learning model can be based at least in part on candidate-entity cluster pair features. The machine learning model can be a model trained on partially labeled documents.

The method can further include using individual classes to handle access to documents, mentions, clusters and candidates. The method can further include tagging the document with the selected entity. At least one of the candidate entity-cluster pairings can include a candidate-entity-mention pairing. In other words, a cluster representative can be a mention from the cluster that is selected to be representative of the cluster.

The subject matter described in this specification can be implemented in particular embodiments so as to realize one or more of the following advantages. The technologies described in this application can provide named entity recognition and disambiguation (NERD) in a manner that is fast and robust relative to known approaches. Such NERD technology is useful for knowledge base population, information retrieval (e.g., question answering), and content analysis. Applications for such NERD technology include: search, i.e., search for entities as opposed to keywords (a form of information retrieval); content recommendation (if a user is reading an article about specified entities that user probably wants to read more articles that are also about those specified entities); and entity representation (using the statistics of entity co-occurrence in documents to determine how to represent an entity).

This specification describes: an end-to-end system that can be deployed as a single engine; a system that can be customized for different types of documents and for different domains; a system that is trainable and can be updated with new data or expertise; a machine learning approach and use of features that allow the system to have better precision and recall; a modular system (as the technology for individual steps improves, such individual step technology can be swapped out for the improved technology); and a system where intermediate results are made available for other purposes such as debugging, and research. The machine learning model can be trained with documents or text where only a subset of the mentions are labeled rather than needing all mentions labeled. Implementations of a system described in this specification can use both local and global features of a document, the knowledge base, and combinations of these features and the knowledge base.

The details of one or more embodiments of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

This specification describes technologies for named entity recognition and disambiguation (NERD). These technologies generally involve receiving a document; clustering entity mentions within the document into clusters; and predicting entities for each cluster e.g., using a machine learning model such as a machine learning model trained only on partially labeled documents.

Figure 1:
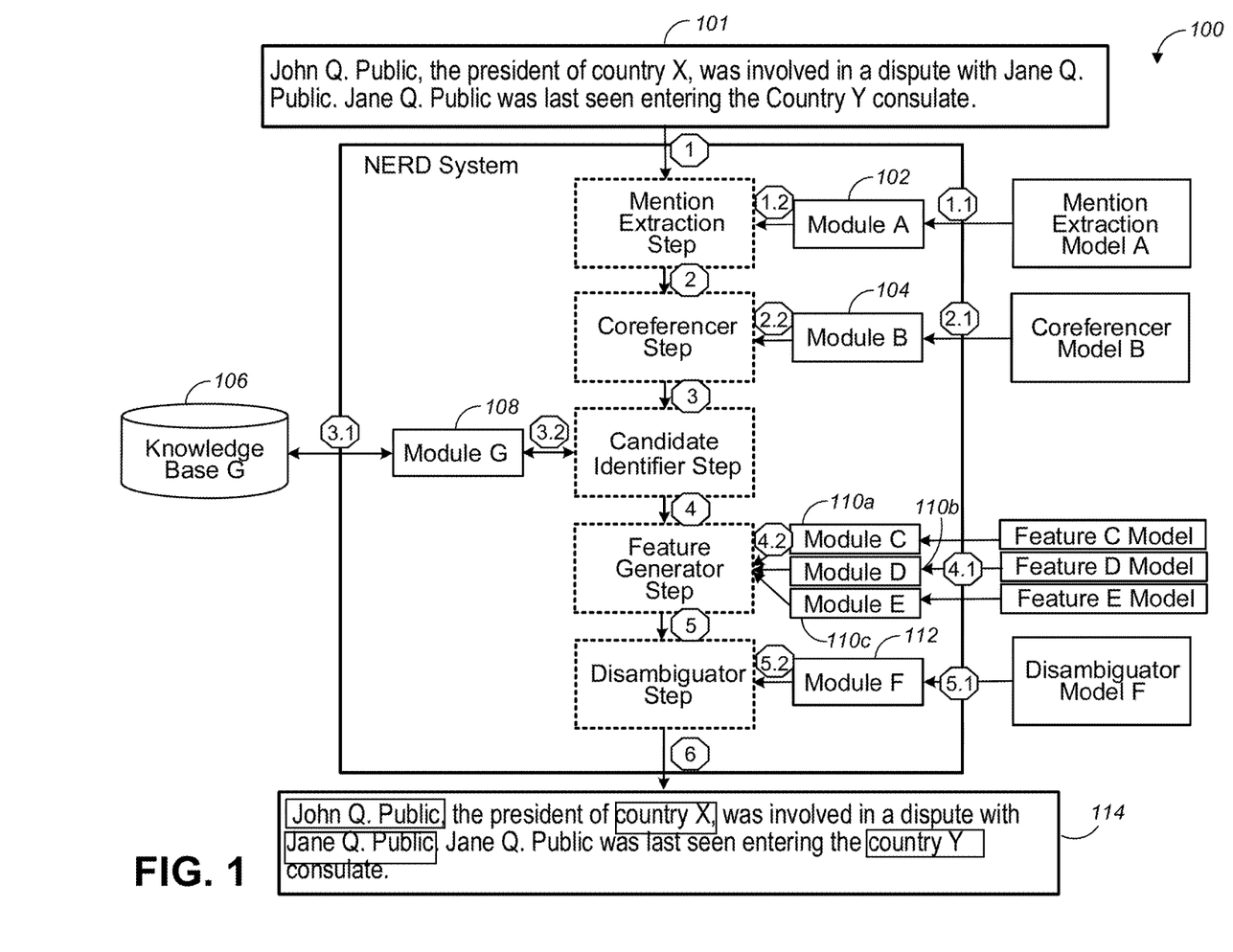
FIG. 1 is a diagram showing an example of a named entity recognition and disambiguation (NERD) system.

FIG. 1 shows an example NERD system 100. The NERD system 100 includes a mention extraction module 102, a coreferencer module 104, a knowledge base 106, a candidate identifier module 108, a set of feature generator modules e.g., 110a, 110b, 110c, and a disambiguator module 112. One or more of the modules can have an associated model that the module can reference when executing. A user can exchange or update a model as a way of updating or improving a module and its associated step in the NERD process. As illustrated, the NERD system 100: receives a document 101; at step 1, extracts (using the mention extraction module 102) mentions from the document; at step 2, clusters (e.g., using a coreferencer module 104) the plurality of mentions to produce at least one cluster; at step 3, identifies (using a knowledge base 106 and a candidate identifier module 108) a plurality of candidate entities for the cluster and pairs each candidate entity and the cluster to create a plurality of candidate entity-cluster pairings; at step 4, generates features (using the feature generator modules e.g., 110a, 110b, 110c) for the plurality of candidate entity-cluster pairings; and at step 5, selects (using a disambiguation module 112) an entity, from the plurality of candidate entities, for the cluster based at least in part on features of the plurality of candidate entity pairings. This process results in an annotated version 114 of the document. In the illustrated example the annotated version of the document 114 includes annotations for two individuals, i.e., John Q. Public and Jane Q. Public, and for two countries, i.e., countries X and Y.

As another example, consider the following exemplary input: "Company X is moving ahead with their cryptocurrency trading operations despite tepid interest from customers." The corresponding exemplary output can be the following:

{
"mention text": "Company X",
"start": "0",
"end": "9",
"confidence": 0.85,
"entity id": "Q193326",
"entity label": "Company X",
"coreference cluster id": "0",
"coreference score": 1,
"entity type": "COMPANY"
}

Start and end are the character offsets for the mention in question. 0 is the beginning of the span, 9 is the end of the span. The coreference score indicates the degree to which the coreferencer determines that the mention belongs to a cluster and in this example it ranges between 0 and 1.

The output can provide a text span, knowledge base ID and label and details from the coreference clustering and the entity type. The system can also output features that were generated for the candidate that was selected. The confidence score indicates the systems confidence in the predicted entity.

§ 1 Examples

An entity can be a 5-tuple including the following.
1. UID, a universal identifier.
2. Prior, a prior probability or likelihood score, L(Entity), approximating the frequency the entity would occur in the corpus of interest. For example, for a news corpus and a wikimedia knowledge base, one can estimate an unknown prior using the entity's frequency in wikipedia articles and/or the number of page views.

3. EBoW, an entity's Bag of Words, a set of words typically associated/used with mentions of the entity in regular usage. Examples include Wikipedia pages, news articles, a short description, or simply a bag of words.
4. Type, the entity's type given an ontology.
5. Aliases, a non-empty set of aliases (as described below).

An Alias can be a string commonly used in natural language to refer to an entity along with two conditional probabilities:
1. P(Alias|Entity) is the probability that the string would be used as an Alias (also known as a mention) of the entity in text; and
2. P(Entity|Alias) is the probability that the knowledge base entity is the correct one given the Alias.

To make use of these probabilities, one is not required to have the true probabilities for the task at hand, but simply some estimates based off of usage within the knowledge base (or the knowledge base's text content) that may or may not transfer to the corpus of documents to which a NERD system described in this specification is applied.

One Alias can be given priority and referred to as the entity's Label.

An Ontology can be a multi-class classifier that predicts a distribution over entity Types. Entities of the same type should have related semantic meaning and similar usage in text.

A knowledge base can be a triple of an Ontology, a set of entities, and a Similarity Function, e.g., where the Similarity Function maps two entities to a score correlated to how likely the two entities would co-occur in natural language.

A named entity can be any entity in a chosen knowledge base. A False Positive Mention is a mention that has been determined to not be in the given knowledge base, therefore if a mention is False Positive or not depends on the given knowledge base.

Example: Wikidata items have UIDs called QIDs. Viewing an individual QID, like Q2, as part of a knowledge base, one can define its attributes as follows:
1. UID=QID
2. Let L(Entity) be the number of page views of the Q2's English Wikipedia page, in this case the Wikipedia page for "Earth."
3. Use the content of the Wikipedia page as the entity's Bag of Words.
4. Use the Wikidata instanceof property to define its type as "inner planet".

Example: One option for Aliases, is to use the Wikidata-provided aliases and assign uniform probabilities to those aliasases (Wikidata acts as central storage for the structured data of Wikimedia projects including Wikipedia):
Q2 Aliases=[Blue Planet, The world, Planet Earth]
P(Blue Planet|Q2)=1/3
P(Q2|Blue Planet)=1/(Number of entities that have Blue Planet as an Alias)

Example: Another implementation uses Wikipedia's anchor text-link structure to generate Aliases:
Q2 Aliases=The set of all anchor texts used in links that point to Q2's English Wikipedia page for "Earth."
Anchor-Entity count=Total number of times a specific anchor text (Anchor Text) links to Q2's English Wikipedia page for "Earth."
P(Anchor Text|Q2)=(Anchor-Entity count)/(Total number of links to Q2's English Wikipedia page for "Earth.")
P(Q2|Anchor Text)=(Anchor-Entity count)/(Total number times Anchor Text links to anything)

Example: Aliases and their probabilities could also be manually generated based on a domain expert's judgment of the respective likelihoods.

Example: A simple Ontology defined on Wikidata items can be established by assigning each item to either a Person, Location, Organization, or Other based solely on the item's instance of property. "Other" would be a catch all type used if none of the other types matched.

Example: Wikipedia and Wikidata combined can then define a knowledge base using the entity and Ontology examples above. An example of a Similarity Function between entities is the Pointwise Mutual Information (PMI) of the link sets between pages, where link sets are defined using Wikipedia page to Wikipedia page hyperlinks. PMI is a measure of association used in information theory and statistics.

A Coreferencer can cluster mentions within a single text that refer to the same entity without identifying that entity in a knowledge base. Coreferencers usually make this determination based solely on the text of the originating document. There are multiple ways to coreference. The goal is to find the text spans of entity mentions and to cluster the mentions together that are referring to the same entity.

To extract mentions, options include:
1. Using a named entity recognition (NER) model to find all "proper nouns" and use those as mentions.
2. Use a "Gazetteer" built just with the aliases in the knowledge base to find all aliases and use those as mentions.

Given mentions, clustering options include:
1. Custom rule-based clustering using pairwise text/string similarity.
2. A machine learning unsupervised clustering method.
3. A user supplied glossary look up that maps mentions together or mentions to entities.

Alternatively, some coreferencing models perform mention extraction and clustering in one step.

Example: A simple coreferencer could focus only on coreferencing names of people where the names are only clustered together if they are a substring of the earliest mention.

A Type Predictor can take in a text document and one of its mentions and assign the mention a probability for each Type in a given Ontology.

A Topic Model can take in a text document and predict a vector of probabilities associated with a chosen set of topics.

A global (document level) preference to disambiguate mentions to entities that have high similarity with each other is called Coherence. For a given set of mentions and entity candidates, the entity candidates that maximize coherence are called the Coherent Entities.

NERD Training Data can be a set of triples of the form (text document, mention, and entity UID).

Example: Let NERD Training Data={(Wikipedia page, anchor text, QID of anchor link target)}

A NER system can take in a text document and produce text spans (specifying character offset boundaries), called mentions, that most likely reference an entity in a given knowledge base. In one implementation, given a sequence of characters $C=(c_0, \ldots, c_N)$ representing a text document, NER can partition the sequence $0, \ldots, N$ into intervals $P=\{[a_i, b_i] | b_i < a_{i+1}, a_0=0, \text{ and } b_N=N\}$ and define a mapping $\delta: [a, b] \to \{0,1\}$ such that 1 means the interval represents a mention of a named entity and 0 means it does not. The intervals can be called text spans and those mapped to 1 can be called mentions. Therefore, NER can be considered a function, that maps a text document d to a set of pairs containing the characters and text spans of each Mention in the document. i.e.

$$f:d \rightarrow \{((c_a, \ldots, c_b),[a,b])|\delta([a,b])=1\}$$

Named entity disambiguation (NED) can find the correct entity in a knowledge base (sometimes denoted KB) for a mention. Given a document D containing a set of mentions $M=\{m_1, \ldots, m_N\}$ and a target KB the task of NED is to find a mapping $M \rightarrow KB$ that links each mention to its correct entity in the KB. We denote the output of the matching as the tuple $(e_1, \ldots, e_N)$ where $e_i$ is the assigned entity for mention mi and $e_i \in KB$. Note, to handle false positive mentions, there is a null entity that denotes there is no match for the mention.

§ 2 NERD Process

Figure 2A:
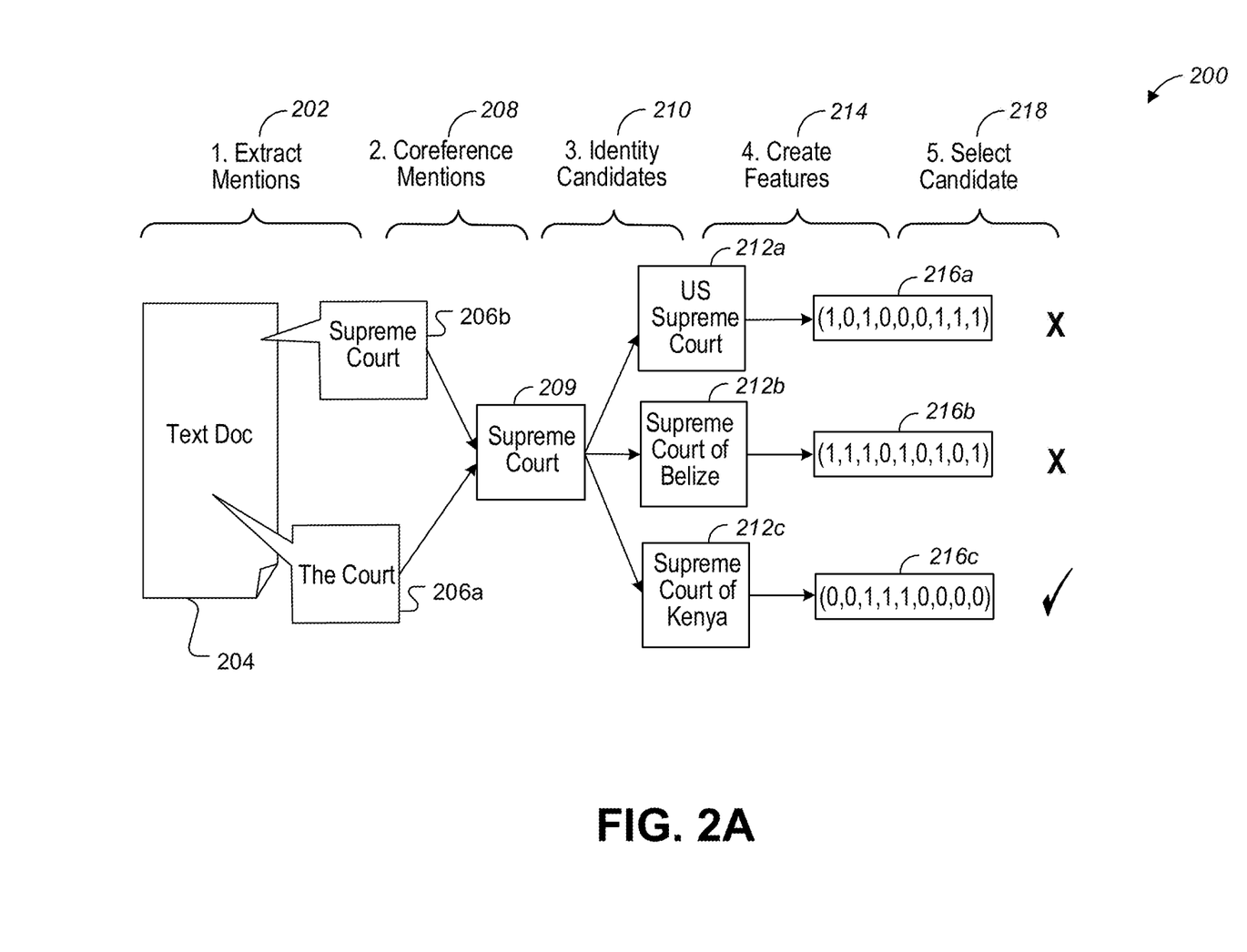
FIG. 2A is a diagram showing an example of a NERD process applied to a document.

A NERD process described in this specification can apply five main steps to each text document in sequence. FIG. 2A is a diagram showing an example of a NERD process 200 applied to a document. With reference to FIG. 2A, the five main steps include: extracting mentions 202; clustering mentions 208 into a cluster, e.g., using a coreferencer; identifying entity candidates 210 for the cluster resulting in candidate entity-cluster pairings; creating features 214 for the candidate entity-cluster pairings; and selecting an entity 218 from the candidate entities. Each step is modular, which allows for swapping in and out a given step/process depending on the problem and depending on user preferences. One result of this approach is user-directed domain specificity (companies, geopolitics, etc.).

With continuing reference to FIG. 2A, one example of a NERD process (applied to each of a set of documents) is as follows:

1. The Extracting Mentions step 202 identifies text spans likely referencing an entity, e.g., using a NER model or Gazetteer. One can customize this step by training one or more custom models. The addition of custom NER types allows for highly specific recognition in certain areas that would not be found elsewhere along with standard people, places, etc.
2. The Clustering Mentions step 209, e.g., by using a coreferencer, clusters the above-mentioned extracted mentions and can identify a cluster representative, e.g., using the coreferencer. The system allows for swapping in and out various coreference models or clustering logic.
3. The Identify Candidates step 210 can restrict the space of possible knowledge base entities from millions to hundreds or fewer so that feature generation (e.g., the following step) can be completed in a reasonable amount of time. For example, step 210 can filter knowledge base entities to just those with aliases sufficiently similar to each mention's coreference cluster representative. The identifying candidates step can use context and aliases. For example, in an implementation that uses Wikimedia as the knowledge base, the system can use text similarity between a cluster representative's text and an entity's aliases.
4. The Create Features step 214 can generate and/or aggregate article, mention, and candidate based features for each (mention, candidate) pair. Thus this step can use the full article that contains the mention(s), mention details, and the candidate's knowledge base data for each pair. The feature set can include a coherence feature. Coherence is a global feature that applies to the entirety of a document as opposed to each individual mention pair in a document. One implementation of coherence contains optimizations (e.g., chunking articles, caching, and database operations such as redis set operations). To expand on this last point, as described further below, the full coherence calculation can scale poorly and can become slow for large documents, documents with large numbers of clusters, or documents with a small number of clusters but a large number of candidates. To get around this bottleneck, a NERD system can:
  a. chunk articles into pieces that a coherence determination can consider independently (in one implementation one can only consider a subset of the possible edges in a similarity graph);
  b. cache results (i.e. if the similarity between two entities is requested twice one can use the saved answer from the first calculation instead of calculating it twice);
  c. perform database operations such as redis set operations in which a similarity measure between entities can be used in the coherence determination. One implementation uses a similarity measure that relies on set intersection calculations. Redis is a fast key/value store that provides set operations.
5. The Select Optimal step 218 applies, for each candidate entity-cluster pair (also sometimes referred to as a (mention, candidate) pair), a trained ML model to the pair's features to select an entity from the candidate entities, e.g., based at least in part on the generated/aggregated features of the candidate entity-cluster pairs. Implementations can use bagging and/or boosted tree models with hyperparameters set using Bayesian optimization. Alternatively one can use neural network models or any other supervised machine learning model.

With reference to the example illustrated in FIG. 2A, an exemplary process 200 receives a document 204. A document can refer to text or content in many forms including a web page, a knowledge base entry, speech that is converted to text, and a query. The extracting mentions step 202 extracts mentions. In the illustrated case there are two mentions, i.e, "The Court" 206a and "Supreme Court" 206b that are identified by a named entity recognition (NER) module. Next, a cluster mentions step 208 clusters the mentions into a cluster using a coreferencer. The cluster can have a representative mention. In the illustrated example the representative mention for the cluster is "Supreme Court" 209. An identify candidates step 210 identifies candidates for the cluster and can create candidate entity-cluster pairs. In the illustrated example, the candidates include "US Supreme Court" 212a, "Supreme Court of Belize" 212b, and "Supreme Court of Kenya" 212c. A create features step 214 then creates features for at least some of the candidate entity-cluster pairs. In the illustrated example, the feature values for the US Supreme Court-Supreme Court pair, the Supreme Court of Belize-Supreme Court pair, and the Supreme Court of Kenya-Supreme Court pair are shown in 216a, 216b, and 216c, respectively. Finally, the select candidate entity step 218 selects a candidate entity based at least in part on the feature values. In the illustrated example, the process selects the Supreme Court of Kenya entity 212c as the entity for the cluster 209 and the document's text can be tagged with that entity.

In one implementation, there are three basic sources of candidate entity-cluster pair (candidate entity, cluster) features to use in selecting a candidate: the text document containing the mentions, the mentions themselves, and the candidate's knowledge base entry (e.g., the candidate's name as well as the data that the knowledge base has for the candidate). Some features, like coherence, combine elements from all three sources to encapsulate a complex relationship. For each (candidate entity, cluster) pair, one can compile the following features into a vector (there are many options for feature engineering including custom features and combinations of the following features or features derived from the following features):

Candidate prior is the prior probability or likelihood score, L(Entity), that an arbitrary text span is mentioning this entity.

Conditional alias probabilities—P(Alias|Entity) and P(Entity|Alias), are the probabilities that the mention's string would be used as a mention of the candidate entity in text and vice versa.

Topic tag similarity or topic similarity (described further below) is a topic model vector similarity score or distance between the text document and the candidate's text content.

Type similarity (described further below) is a type probability vector similarity score or distance between the cluster representative's type (and the type of its document) and the candidate's type.

Text similarity (described further below) is the cosine similarity between the embeddings of the text document and embeddings of the candidate entity's textual content.

Coherence scores are scores indicating how coherent (described further below) the candidate is given the rest of the mentions in the document.

Topic similarity (noted above) compares per-topic binary classification scores of the source document's text and the candidate's textual content, yielding a metric of thematic similarity.

A document may have one or more salient topics. For example, a news story may be about protest and authoritarian politics; an SEC filing may be about metals and taxes. Topic similarity compares the topics present in the source document with the topics present in the text of the candidate entity, assisting in disambiguation.

For example, a news story may contain the text span "Jordan" that the system determines has two candidates for disambiguation: Jordan, the country, or Michael Jordan, the basketball player. By looking at the text content present for these candidate entities (coming from sources like a knowledge base, e.g., Wikipedia), the system can determine that the relevant topics for the country of Jordan are geopolitics and international cooperation while the salient topics for Mr. Jordan are sports and manufacturing, due to Mr. Jordan's popular sneaker brand. Given this information, the system can make a comparison of the topics present in the source document with the mention "Jordan." If the topics of the source document overlap with the topics of the country of Jordan, the system is more likely to match with the geopolitical entity than the basketball star; conversely, if the source document is about sports, the system determines that Michael Jordan is the more likely disambiguation.

Comparing document and candidate topics requires (1) determining a robust set of topics that would be relevant for disambiguation tasks, and (2) developing binary classification models for each of these topics. Once there is a set of models for each topic, implementations of a disambiguation system can apply this suite of models to the textual content for each candidate entity in a knowledge base. Then, when a new document is being processed, the system can compute the topic scores and compare the topic scores to the pre-computed scores for the candidates in the knowledge base. Since each document and candidate have a set of topic probability scores (e.g., ranging from zero to one), the system can combine these scores into a vector and use standard vector similarity metrics to compute topic similarity.

Type similarity compares the predicted type of the mention text and the known type of the candidate.

Using type similarity, an implementation of the system provides a similarity metric between the mention's type prediction vector and the true type of the candidate entity from the knowledge base. Here, "type" refers to the ontological classification of the entity in a given taxonomy. For example, the system can have three categories of entities: people, locations, and organizations. The system can use a richer ontology that includes categories such as animals, plants, countries, cities, and vehicles. If the type of the mention matches the type of the candidate, that is a strong indicator of a potential match; more importantly, if the type of the mention does not match the type of the candidate, one implementation of the system can rule out that candidate.

For example, given the sentence "I saw a beetle in the parking garage"—the entity "beetle" could have both the Volkswagen Beetle and the Stag Beetle as candidates for disambiguation. Knowing the type of "beetle" the system is disambiguating makes this choice simple. If "beetle" is of type vehicle, the system can pick the VW; if "beetle" is of type animal, the system can determine that the mention is about the bug. Type similarity solves many disambiguation challenges. However, it is not useful for disambiguations between candidates of the same type (ie: "Graham Greene" may refer to the British author or the Canadian actor, but they are both of type person, so type similarity does not offer additional insight).

Implementations of the system can determine the types of candidate entities from the knowledge base. To determine the type of the mention, the system can use a predictor model to make a prediction of the type of the mention. The model can classify the mention into the same set of categories as are present in the knowledge base. Stated differently, each entity (candidate) in the knowledge base usually comes with a type (person, company, country, government, etc.). A mention type predictor can predict the same types that the knowledge base uses, so that the NERD system can compare the mention's predicted type and a candidate's knowledge base type. This predictor model can derive an embedding of the mention text and use that embedding to train a model such as a support vector machine (SVM); the model can be a more complex deep learning model that uses long short-term memory (LSTM) nodes or CNN (convolutional neural network) nodes. Regardless of the type of predictor model used, the output prediction vector can be compared to the type categorization of the candidate to determine similarity. As the accuracy of the underlying type predictor model improves, the quality of this feature also improves.

The system can use text similarity by using the cosine similarity between the embedding of the text document and the embedding of the candidate's entity textual content.

Using text similarity, the system can compare the source document of a given mention with the textual content for each candidate entity. This textual content can be the introduction section of the Wikipedia page of the candidate entity, a several-sentence description of the candidate entity from a database, or another text source related to the entity.

This feature is useful in disambiguating many candidates of the same type. For example, the text span "Anne Hathaway" may refer to the Academy Award winning actress born in 1982, or it could refer to the wife of William Shakespeare who lived in the sixteenth and seventeenth centuries. By looking at the similarity between the source document and the Wikipedia pages of these two women, the system can make a more straightforward disambiguation. If the source document contains text such as "The Princess Diaries" and "Forbes Celebrity 100", the system disambiguates the text span to the modern-day Anne Hathaway. However, if the source document contains text such as "sonnet" and "English playwright", the system can more strongly identify the mention as referencing the Anne Hathaway who married Shakespeare.

To accurately measure text similarity, both the source document of the mention and the textual content of the entity must be embedded into the same vector space. One embedding option is a term frequency-inverse document frequency (TFIDF) embedder; TFIDF counts the words of a document and weights them by their importance. A TFIDF embedder converts text to a many-dimensional vector, which can then be reduced to a more manageable size with dimensionality reduction. Once the source document and entity textual content are in the same embedding space, the system can determine similarity using a distance metric like cosine similarity.

Coherence scores are scores indicating how coherent (described further below) the candidate is given the rest of the mentions in the document. Coherence helps with especially difficult disambiguation problems. For instance, there are over 200 supreme courts in Wikipedia. In that context, if the system detects the text span "Supreme Court", the system can be challenged to detect which supreme court is correct. One implementation of coherence makes use of both anchor link probabilities and entity similarities. The entity similarities can be calculated using the normalized google distance between two wikipedia pages using bi-directional page links. In one implementation, the system can use the normalized google distance (NGD):

$$NGD(x, y) = \frac{\max\{\log f(x), \log f(y)\} - \log f(x, y)}{\log N - \min\{\log f(x), \log f(y)\}}$$

where "x" is a set of undirected (incoming and outgoing) links to page x (i.e. a set of page ids), and "y" is the set of undirected links to page y. Then f(x) is the size of the set "x", f(y) is the size of the set "y" and f(x,y) is the size of the intersection of "x" and "y". In this way, the system can use the functional form of the NGD to calculate the distance between any two pages (i.e. entities). The coherence step is costly as a large number of entity similarities have to be evaluated even for a modestly sized article.

The coherence calculation time is dominated by the entity similarity calculation. The number of similarity evaluations (Ne) in a naive implementation scales like $Ne \sim Nm^2 * Nc^2$ where Nm is the typical number of mention clusters in an article and Nc is the typical number of candidates for a mention cluster. In one implementation, the system does one disambiguation per cluster. In other words, after the mention clustering step, the cluster is basically treated as a single mention. Our implementation uses "pairwise" coherence in which the complexity scales like (Nm choose 2)* $Nc = \frac{1}{2} *(Nm^2-Nm)*Nc$. Even so, this can lead to hundreds of thousands or even millions of similarity evaluations per article. One can optimize this process by implementing adjustable filters on anchor link probabilities and entity similarities, performing the similarity calculation set operations in redis, and using caching to store common entity pair similarities.

In addition, one can implement a chunking optimization for long documents. If a document contains more than a specified number of mentions, the NERD system can break it up into smaller pieces and evaluate each separately. Indeed whether the system breaks a document up into smaller pieces can depend on not only the number of mentions, but also the number of candidates per mention. One thousand mentions could be quick to analyze if each mention only has two candidate entities, but if each mention has four hundred candidate entries in the knowledge base, the number of similarities to evaluate becomes much larger. In one implementation, the NERD system can break up the document when it has more than a specified number of mentions, e.g., a specified number of mentions between 50-100 mentions and breaking up of the document into chunks is done so that each chunk has the same number of mentions. One can then compose pseudo articles by joining the first section with each of the following sections and running the coherence calculation on each pseudo article. For example, if one broke an article into 5 chunks one would have 4 pseudo articles that are formed as follows:

chunk1+chunk2
chunk1+chunk3
chunk1+chunk4
chunk1+chunk5

This approach can be generalized to a process that breaks a document up into one or more sub-documents when the document has more than a specified number of mentions and applying the process outlined above to the sub-document.

Using entity similarity, we can determine if a set of predicted entities cohere. For example, if we predict the entities United States and Chief Justice John Roberts, the text span "Supreme Court" is likely to refer to Supreme Court of the United States, since it is highly similar to the other entities. However, if we see the entities Kenya and Chief Justice David Maraga, the text span "Supreme Court" is more likely to refer to Supreme Court of Kenya. These examples display how coherence can assist with difficult disambiguations.

§ 3 Architecture

Interchangeability and modularity designed into the NERD system described in this specification allows users to replace core default operations with custom modules. For example, a NERD system can include a mention extractor, but if a user wants to use her own mention extractor, she should be able to do so with minimal effort. To accomplish this, a NERD system can include:

Abstract Base Classes (ABC)

Figure 2B:
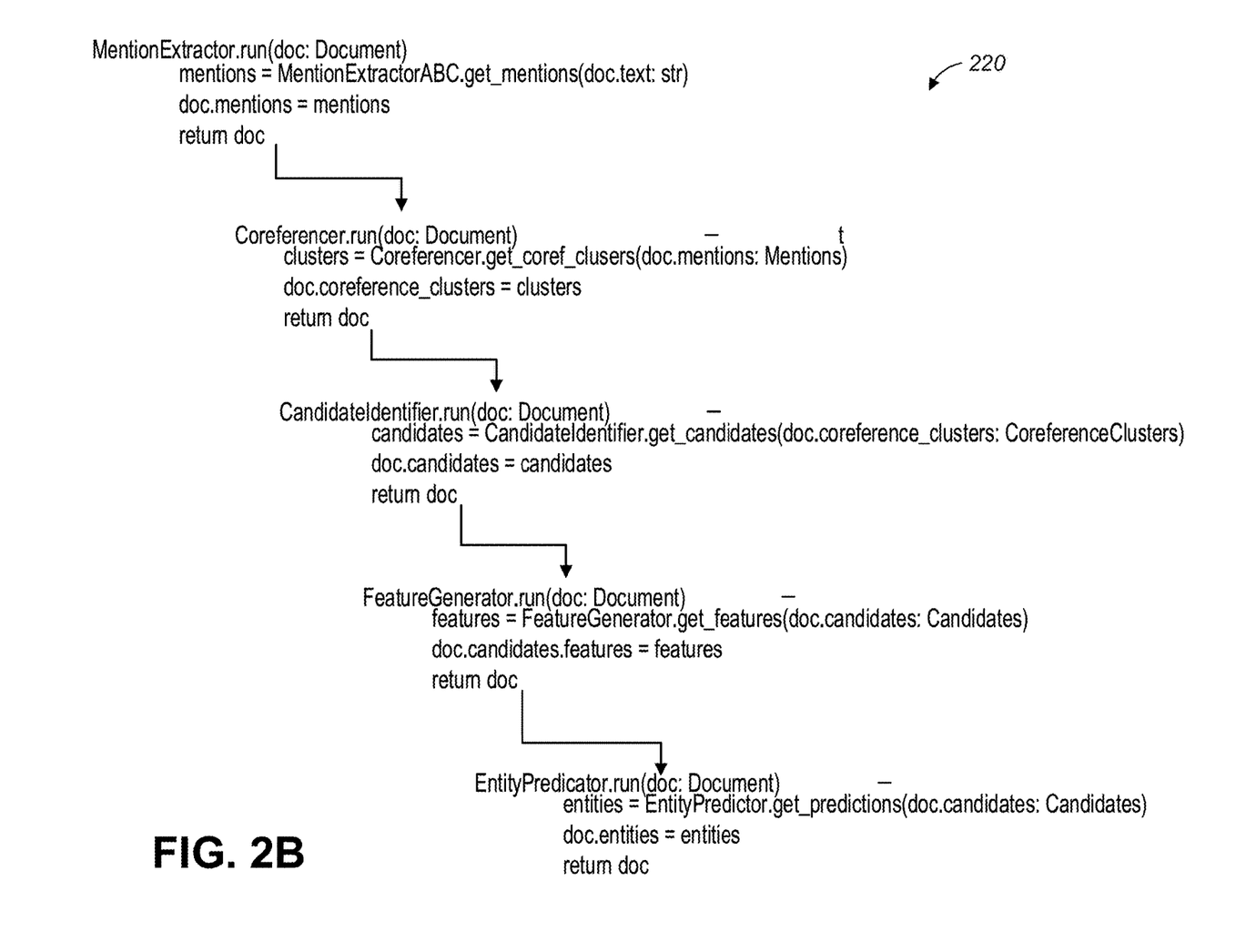
FIG. 2B is a diagram showing an example of a high level package architecture.

Each step can have its own ABC with abstract methods for the core step logic, but a fixed transform method to enforce an API contract on non-default modules. Each step inputs and outputs the same type—a Document object as shown in FIG. 2B. FIG. 2B is a diagram showing an example of a high level package architecture 220. More specifically, in the implementation illustrated in FIG. 2B, a mention extractor package produces a document that is the input of a coreferencer packages which in turn produces a document that is the input of candidate identifier packages, which in turn produces a document that is the input of a feature generator package which in turn produces a document that is the input of an entity predictor package.

Interchangeability and modularity can drive the package design. Users can replace core default operations with their own custom modules. For example, the NERD system has a mention extractor, but if a user wants to use their own, they should be able to with minimal effort. To accomplish this:

Each step implements a 'NerdStep' ABC with fixed 'run' and 'batch run' methods to enforce an API contract on non-default modules. Each step takes as input a Document or DocumentBatch object and a KnowledgeBase object and outputs a Document or DocumentBatch object. (As reflected in FIG. 2B)

ABC can be used for each feature computation module so that users can swap a custom feature computation module for the feature computation modules provided by default, for example, a user might have their own topic models, type predictors, or coherence model she would like to use.

Step Properties

Steps can have an idempotent option if a user does not want to use that step. This option simply allows subsequent steps to run. For example, an idempotent coreferencer would simply make each mention its own coreference cluster and its own representative. This allows the candidate identifier step to run without doing any clustering of the mentions.

Steps can have an option to log or dump state for debugging and auditing, but the default can be to not write data.

Connections to databases and datastores can be handled internally or externally to the system.

Modularity

Individual classes can be used to handle access and operations to Documents, Mentions, Type Predictions, Coreference Clusters, Candidates, Features, and Entity Predictions.

Internal processing and formats can be agnostic to/insulated from the user's parsing, formatting, and uid needs.

In one implementation, a user is able to turn features on or off depending on if the trained model can handle a feature being turned off. A user's ability to turn one or more features off allows the rest of the system to be used when a knowledge base or training data set is missing a feature (i.e. alias probabilities).

Enforcing Compatibility

Since later pipeline steps can depend on the versions and types of earlier pipeline steps, one approach is to introduce two ABCs, Recognizer and Disambiguator. Recognizer implementations lock in a Mention Extractor and Coreferencer step, while Disambiguator implementations lock in a Candidate Identification, Feature Generator, and Entity Predictor steps.

Figure 3:
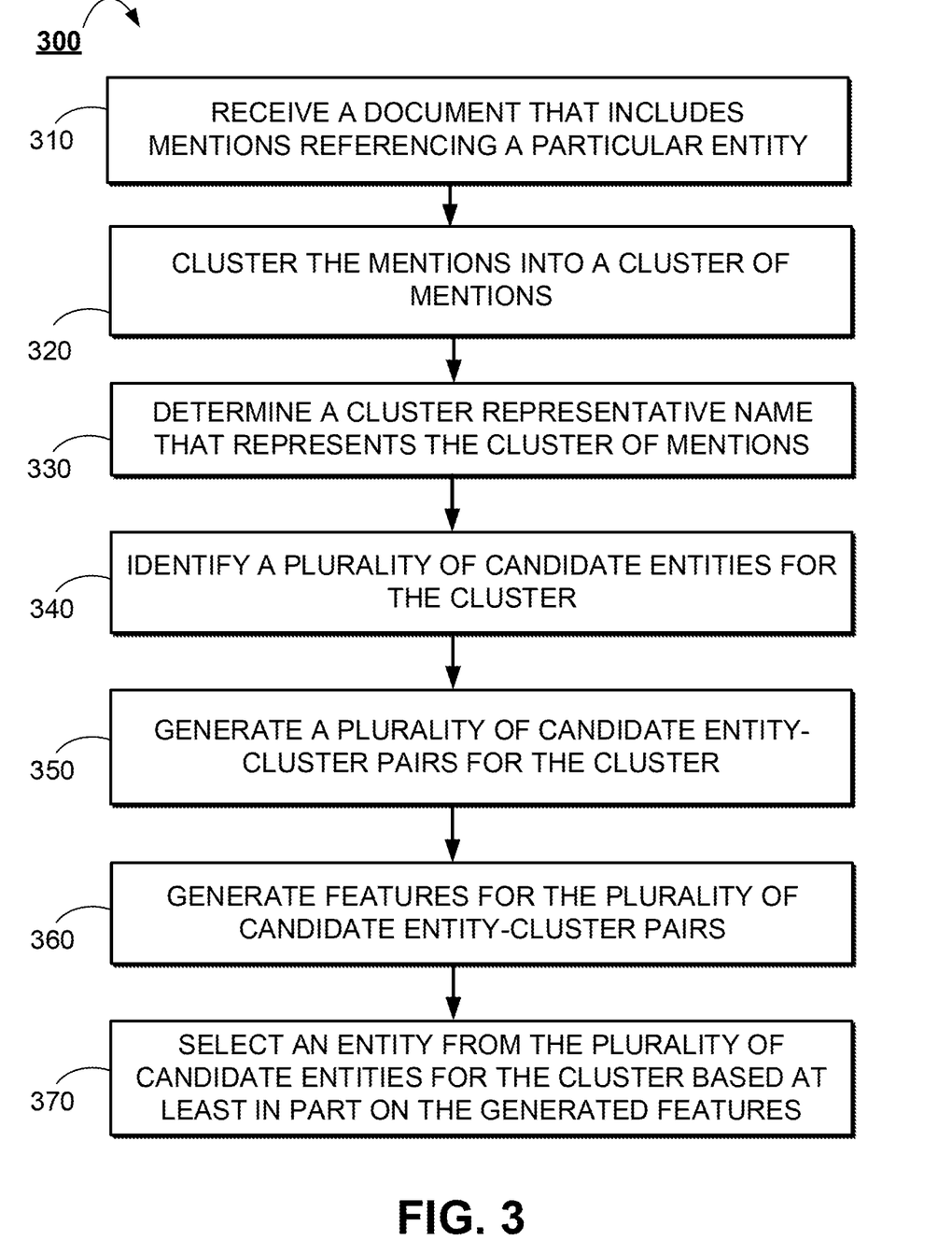
FIG. 3 is a flow chart of an example of steps in a NERD process.

FIG. 3 is a flowchart of an example process 300 for named entity recognition and disambiguation. For convenience, the process 300 will be described as being performed by a system of one or more computers, located in one or more locations, and programmed appropriately in accordance with this specification. For example, a NERD system, e.g., the NERD system 100 of FIG. 1, appropriately programmed, can perform the process 300.

As illustrated in FIG. 3, one example of a NERD process 300 includes: receiving 310 a document that includes multiple mentions, where a mention extraction module (e.g., a named entity recognition module) determines mentions referencing a particular entity; clustering 320 the mentions into a cluster of mentions; determining 330 a cluster representative name that represents the cluster of mentions; identifying 340 a plurality of candidate entities for the cluster; generating 350 a plurality of candidate entity-cluster pairs for the cluster; generating/aggregating 360 features for the plurality of candidate entity-cluster pairs; and selecting 370 an entity form the plurality of candidate entities for the cluster based at least in part on the generated features. The NERD process, such as the example of the NERD process illustrated in FIG. 3, can be used to a variety of applications including knowledge base population, information retrieval including question answering, and content analysis. A NERD system can be implemented as a microservice or as a step in a Message Queuing system, for example on a RabbitMQ or Kafka pipeline.

Figure 4:
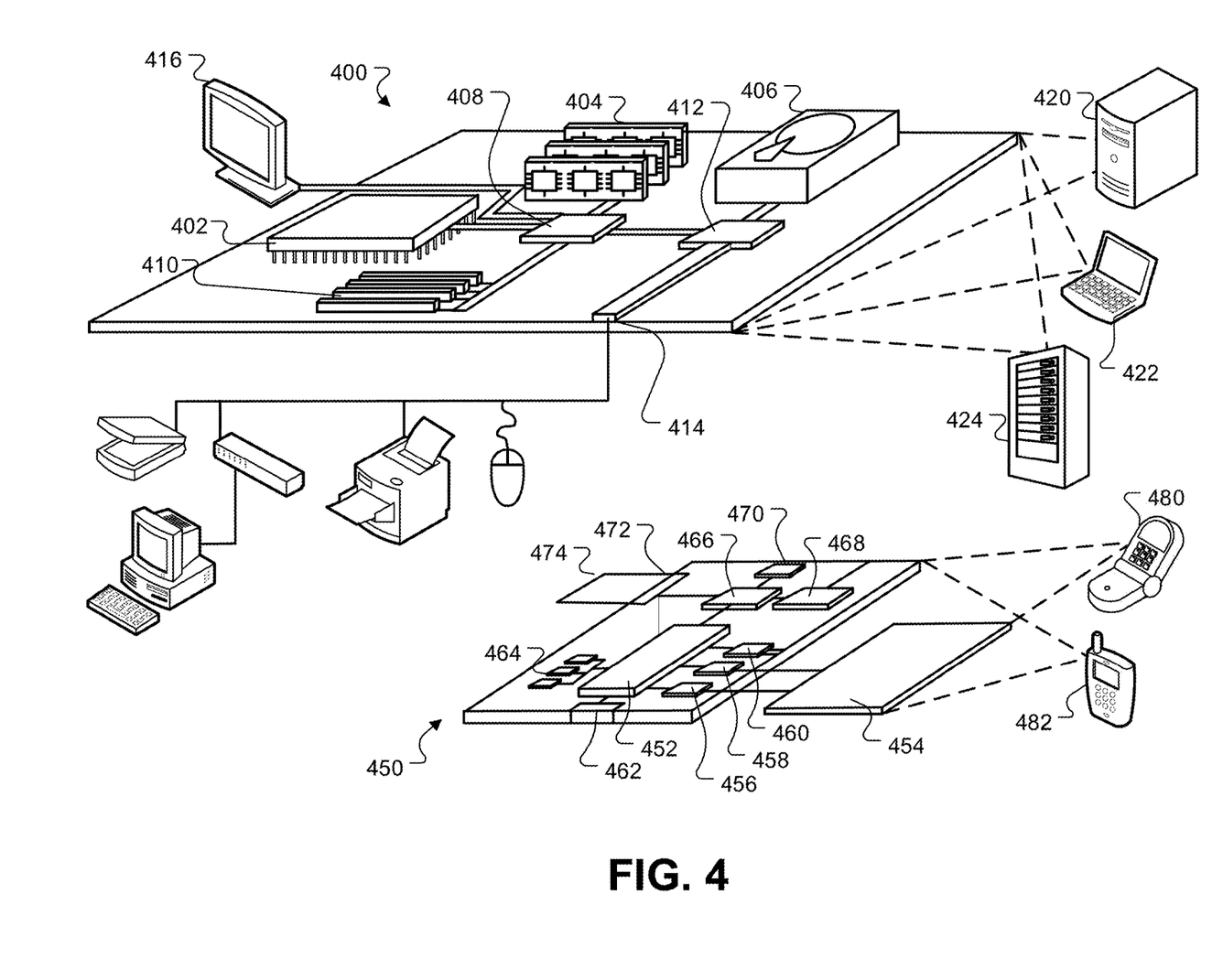
FIG. 4 is a diagram showing an example of hardware for use in a NERD system.

FIG. 4 is a diagram showing an example of hardware for use in a NERD system. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. Additionally, computing device 400 or 450 can include Universal Serial Bus (USB) flash drives. The USB flash drives can store operating systems and other applications. The USB flash drives can include input/output components, such as a wireless transmitter or USB connector that can be inserted into a USB port of another computing device. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and can be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses can be used, as appropriate, along with multiple memories and types of memory. Also, multiple computing devices 400 can be connected, with each device providing portions of the necessary operations, e.g., as a server bank, a group of blade servers, or a multi-processor system.

The memory 404 stores information within the computing device 400. In one implementation, the memory 404 is a volatile memory unit or units. In another implementation, the memory 404 is a non-volatile memory unit or units. The memory 404 can also be another form of computer-readable medium, such as a magnetic or optical disk.

The storage device 406 is capable of providing mass storage for the computing device 400. In one implementation, the storage device 406 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The information carrier is a computer-or machine-readable medium, such as the memory 404, the storage device 406, or memory on processor 402.

The high speed controller 408 manages bandwidth-intensive operations for the computing device 400, while the low speed controller 412 manages lower bandwidth intensive operations. Such allocation of functions is exemplary only. In one implementation, the high-speed controller 408 is coupled to memory 404, display 416, e.g., through a graphics processor or accelerator, and to high-speed expansion ports 410, which can accept various expansion cards (not shown). In the implementation, low-speed controller 412 is coupled to storage device 406 and low-speed expansion port 414. The low-speed expansion port, which can include various communication ports, e.g., USB, Bluetooth, Ethernet, wireless Ethernet can be coupled to one or more input/output devices, such as a keyboard, a pointing device, microphone/speaker pair, a scanner, or a networking device such as a switch or router, e.g., through a network adapter. The computing device 400 can be implemented in a number of different forms, as shown in the figure. For example, it can be implemented as a standard server 420, or multiple times in a group of such servers. It can also be implemented as part of a rack server system 424. In addition, it can be implemented in a personal computer such as a laptop computer 422. Alternatively, components from computing device 400 can be combined with other components in a mobile device (not shown), such as device 450. Each of such devices can contain one or more of computing device 400, 450, and an entire system can be made up of multiple computing devices 400, 450 communicating with each other.

The computing device 400 can be implemented in a number of different forms, as shown in the figure. For example, it can be implemented as a standard server 420, or multiple times in a group of such servers. It can also be implemented as part of a rack server system 424. In addition, it can be implemented in a personal computer such as a laptop computer 422. Alternatively, components from computing device 400 can be combined with other components in a mobile device (not shown), such as device 450. Each of such devices can contain one or more of computing device 400, 450, and an entire system can be made up of multiple computing devices 400, 450 communicating with each other.

Computing device 450 includes a processor 452, memory 464, and an input/output device such as a display 454, a communication interface 466, and a transceiver 468, among other components. The device 450 can also be provided with a storage device, such as a micro-drive or other device, to provide additional storage. Each of the components 450, 452, 464, 454, 466, and 468, are interconnected using various buses, and several of the components can be mounted on a common motherboard or in other manners as appropriate.

The processor 452 can execute instructions within the computing device 450, including instructions stored in the memory 464. The processor can be implemented as a chipset of chips that include separate and multiple analog and digital processors. Additionally, the processor can be implemented using any of a number of architectures. For example, the processor 410 can be a CISC (Complex Instruction Set Computers) processor, a RISC (Reduced Instruction Set Computer) processor, or a MISC (Minimal Instruction Set Computer) processor. The processor can provide, for example, for coordination of the other components of the device 450, such as control of user interfaces, applications run by device 450, and wireless communication by device 450.

Processor 452 can communicate with a user through control interface 458 and display interface 456 coupled to a display 454. The display 454 can be, for example, a TFT (Thin-Film-Transistor Liquid Crystal Display) display or an OLED (Organic Light Emitting Diode) display, or other appropriate display technology. The display interface 456 can comprise appropriate circuitry for driving the display 454 to present graphical and other information to a user. The control interface 458 can receive commands from a user and convert them for submission to the processor 452. In addition, an external interface 462 can be provide in communication with processor 452, so as to enable near area communication of device 450 with other devices. External interface 462 can provide, for example, for wired communication in some implementations, or for wireless communication in other implementations, and multiple interfaces can also be used.

The memory 464 stores information within the computing device 450. The memory 464 can be implemented as one or more of a computer-readable medium or media, a volatile memory unit or units, or a non-volatile memory unit or units. Expansion memory 474 can also be provided and connected to device 450 through expansion interface 472, which can include, for example, a SIMM (Single In Line Memory Module) card interface. Such expansion memory 474 can provide extra storage space for device 450, or can also store applications or other information for device 450. Specifically, expansion memory 474 can include instructions to carry out or supplement the processes described above, and can include secure information also. Thus, for example, expansion memory 474 can be provided as a security module for device 450, and can be programmed with instructions that permit secure use of device 450. In addition, secure applications can be provided via the SIMM cards, along with additional information, such as placing identifying information on the SIMM card in a non-hackable manner.

The memory can include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452 that can be received, for example, over transceiver 468 or external interface 462.

Device 450 can communicate wirelessly through communication interface 466, which can include digital signal processing circuitry where necessary. Communication interface 466 can provide for communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 468. In addition, short-range communication can occur, such as using a Bluetooth, Wi-Fi, or other such transceiver (not shown). In addition, GPS (Global Positioning System) receiver module 470 can provide additional navigation- and location-related wireless data to device 450, which can be used as appropriate by applications running on device 450.

Device 450 can also communicate audibly using audio codec 460, which can receive spoken information from a user and convert it to usable digital information. Audio codec 460 can likewise generate audible sound for a user, such as through a speaker, e.g., in a handset of device 450. Such sound can include sound from voice telephone calls, can include recorded sound, e.g., voice messages, music files, etc. and can also include sound generated by applications operating on device 450.

The computing device 450 can be implemented in a number of different forms, as shown in the figure. For example, it can be implemented as a cellular telephone 480. It can also be implemented as part of a smartphone 482, personal digital assistant, or other similar mobile device.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In this specification, the term "database" will be used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" will be used broadly to refer to a software based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
   receiving a document;
   extracting a plurality of mentions within the document;
   clustering the plurality of mentions to produce a cluster;
   identifying a plurality of candidate entities for the cluster;
   pairing each candidate entity and the cluster to create a plurality of candidate entity-cluster pairings;
   generating features for the plurality of candidate entity-cluster pairings; and
   selecting an entity, from the plurality of candidate entities, for the cluster based at least in part on the generated features of the plurality of candidate entity-cluster pairings, wherein selecting the entity comprises:
      providing the generating features as an input to a machine learning model that has been trained to generate output data identifying an entity based on processing of a document having only a subset of mentions labeled of a plurality of mentions;
      processing, by the machine learning model, the provided features through each layer of the machine learning model to generate output data identifying an entity; and
      obtaining the output data generated, by the machine learning model, wherein the obtained output data identifies the selected entity.

2. The method of claim 1, wherein extracting a plurality of mentions within the document comprises
   extracting a number of mentions within a document; and
   breaking the document up into at least one sub-document, the sub-document comprising less text than the document, when the number of mentions within the document exceeds a threshold.

3. The method of claim 1, wherein the cluster has a cluster representative.

4. The method of claim 3, wherein identifying a plurality of candidate entities for the cluster further comprises filtering the plurality of candidates to just those with aliases having a similarity score for similarity to a cluster representative above a threshold.

5. The method of claim 1, wherein clustering the plurality of mentions to produce at least one cluster further comprises clustering using a coreferencer.

6. The method of claim 5, wherein the coreferencer clusters the plurality of mentions using at least one of a glossary or a string similarity score.

7. The method of claim 1, wherein the method further comprises performing the extracting, clustering, identifying and pairing steps for a plurality of clusters and wherein generating features for each candidate entity-cluster pairing comprises generating a coherence score, wherein the coherence score indicates how coherent the candidate entity is given other entities that have been paired with clusters.

8. The method of claim 7, wherein the coherence score comprises entity similarities.

9. The method of claim 1, wherein each candidate entity-cluster pairing has a candidate entity and wherein generating features for a candidate entity-cluster pairing comprises obtaining a probability that an arbitrary text span of a mention in the cluster is referring to the candidate entity in a candidate entity-cluster pairing.

10. The method of claim 1, wherein each candidate entity-cluster pairing has a candidate entity and wherein generating features for a candidate entity-cluster pairing comprises obtaining a conditional probability that a text string of a mention of the cluster is used to refer to the candidate entity.

11. The method of claim 1, wherein each candidate entity-cluster pairing has a candidate entity and wherein generating features for each candidate entity-cluster pairing comprises a conditional probability that the candidate entity is referenced by a text string of a mention of the cluster.

12. The method of claim 1, wherein each candidate entity-cluster pairing has a candidate entity and wherein generating features for each candidate entity-cluster pairing comprises obtaining a topic model vector similarity score between the document and text content for the candidate entity.

13. The method of claim 1, wherein each candidate entity-cluster pairing has a candidate entity and wherein generating features for each candidate entity-cluster pairing comprises generating a similarity score between a predicted type of a mention in the cluster and a type of the candidate entity for a candidate entity-cluster pairing.

14. The method of claim 1, wherein each candidate entity-cluster pairing has a candidate entity and wherein generating features for each candidate entity-cluster pairing comprises generating a similarity score between embeddings of the document of a mention of the cluster and textual content of a candidate entity.

15. The method of claim 1, wherein the method further comprises using individual classes to handle access to documents, mentions, clusters and candidates.

16. The method of claim 1, wherein the method further comprises tagging the document with the selected entity.

17. The method of claim 1, wherein at least one of the plurality of candidate entity-cluster pairings comprises a candidate-entity-mention pairing.

18. The method of claim 1, wherein extracting a plurality of mentions within the document comprises extracting a plurality of mentions within the document using at least one of named entity recognition, a glossary or a gazetteer.

19. A system comprising:
one or more computers and one or more storage devices on which are stored instructions that are operable, when executed by the one or more computers, to cause the one or more computers to perform operations comprising:
receiving a document;
extracting a plurality of mentions within the document;
clustering the plurality of mentions to produce a cluster;
identifying a plurality of candidate entities for the cluster;
pairing each candidate entity and the cluster to create a plurality of candidate entity-cluster pairings;
generating features for the plurality of candidate entity-cluster pairings; and
selecting an entity, from the plurality of candidate entities, for the cluster based at least in part on the generated features of the plurality of candidate-entity cluster pairings, wherein selecting the entity comprises:
providing the generating features as an input to a machine learning model that has been trained to generate output data identifying an entity based on processing of a document having only a subset of mentions labeled of a plurality of mentions;
processing, by the machine learning model, the provided features through each layer of the machine learning model to generate output data identifying an entity; and
obtaining the output data generated, by the machine learning model, wherein the obtained output data identifies the selected entity.

20. A method comprising:
obtaining a document;
extracting a plurality of mentions within the document;
clustering the plurality of mentions to produce a cluster;
identifying a plurality of candidate entities for the cluster;
pairing each candidate entity with the cluster to create a plurality of candidate entity-cluster pairings, wherein each candidate entity-cluster pairing has a candidate entity;
generating features for the plurality of candidate entity-cluster pairings, wherein the features include a coherence score and the coherence score indicates how coherent the candidate entity is given a set of mentions in the document for the cluster of the candidate entity-cluster pairing; and
selecting an entity, from the plurality of candidate entities, for each cluster based at least in part on the generated features of the plurality of candidate entity pairings, wherein selecting the entity comprises:
providing the generating features as an input to a machine learning model that has been trained to generate output data identifying an entity based on processing of a document having only a subset of mentions labeled of a plurality of mentions;
processing, by the machine learning model, the provided features through each layer of the machine learning model to generate output data identifying an entity; and
obtaining the output data generated, by the machine learning model, wherein the obtained output data identifies the selected entity.

* * * * *